United States Patent
Chan et al.

(10) Patent No.: US 6,424,651 B1
(45) Date of Patent: Jul. 23, 2002

(54) ARRANGEMENT FOR PERFORMING AUTOMATIC BUILD OUT IN A COMMUNICATIONS SYSTEM THAT SUPPORTS MULTIPLE CONSTANT-BIT-RATE CONNECTIONS

(75) Inventors: Norman C. Chan, Louisville; Norman W. Petty, Boulder, both of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/153,835

(22) Filed: Sep. 15, 1998

(51) Int. Cl.⁷ .............................. H04L 12/56; H04J 3/24; H04J 3/16
(52) U.S. Cl. ................... 370/395.6; 370/474; 370/516; 370/465
(58) Field of Search ...................... 370/395.6, 395.61, 370/465, 466, 467, 474, 516

(56) References Cited

U.S. PATENT DOCUMENTS

| | | | |
|---|---|---|---|
| 5,742,600 A | * | 4/1998 | Nishihara |
| 5,859,850 A | * | 1/1999 | Lien ............................ 370/396 |
| 5,982,783 A | * | 11/1999 | Frey et al. ................ 370/395.6 |
| 5,999,529 A | * | 12/1999 | Bernstein et al. ........... 370/376 |

FOREIGN PATENT DOCUMENTS

DE    44 17 286 A    11/1995    ........... G06F/13/38

OTHER PUBLICATIONS

Fowler et al., "Network Management Considerations for Interworking ATM Networks with Non–ATM Services", IEEE Communications Magazine, Jun. 1996, pp. 102–106.*
Hiroshi Uematsu et al: Impelementation And Experimental Results Of Clad Using SRTS Method IN ATM Networks Proceedings of the Global Telecommunications Conference (GLOBECOM), U.S., New York, IEEE, pp. 1815–1821 XP000488836 ISBN: 0–7303–1821–8.
Hitoshi Uematsu et al: Cell Delay Variation Smoothing Methods For ATM–Based SDH Signal Transport System, Electronics & Communications in Japan, Part 1—Communications, U.S. Scripta Technica. New York, vol. 76, No. 12, pp. 14–27 XP000467463 ISSN: 8756–6621.
Chung–Sheng Li et al: Pseudo–Isochronous Cell Switching In ATM Networks, Proceedings of the Conference on Computer Communications (INFOCOM), U.S., Los Alamitos, IEEE Comp. Soc. Press, pp. 428–437, XP000496495 ISBN: 0–8186–5572–0.

* cited by examiner

Primary Examiner—Wellington Chin
Assistant Examiner—Maikhanh Tran
(74) Attorney, Agent, or Firm—John C. Moran

(57) ABSTRACT

In an asynchronous transfer mode (ATM) disassembler unit that is receiving ATM cells from an optical interface and converting data from these cells onto a constant bit rate (CBR) call, only a nominal predefined build out is defined for each optical interface. If an ATM cell is not received within the proper amount of time for the CBR call from the optical interface, the build out is automatically adjusted so that the build out is equal to the amount of delay that was experienced in receiving the next ATM cell for the call. Only the build out for the individual call that actually experienced the delay of the ATM cell is redefined. The other calls being handled by the optical interface are not effected by this automatic adjustment of the build out interval for the individual call. In addition, when an ATM cell is delayed for a particular call, the information that is transmitted for the call is the last PCM sample of the present ATM cell for that call. This requires in the case of a wideband call that consists of a frame subdivided into a plurality of channels that the frame must be repeated upon an ATM cell being delayed. When the delayed ATM cell is received, all PCM samples for the call are transmitted so that no PCM samples are discarded.

19 Claims, 6 Drawing Sheets

ARRANGEMENT FOR PERFORMING AUTOMATIC BUILD OUT IN A COMMUNICATIONS SYSTEM THAT SUPPORTS MULTIPLE CONSTANT-BIT-RATE CONNECTIONS

TECHNICAL FIELD

This invention relates generally to packet-switching systems, such as asynchronous transfer mode (ATM) systems, and specifically to transmission-delay variations in such systems.

BACKGROUND OF THE INVENTION

Today's business communications environment consists of two separate network infrastructures: a voice network (such as a private branch exchange (PBX)) characterized by real-time, high reliability, constant bit-rate (CBR) connections; and a data network (such as a packet network) characterized by high-bandwidth variable bit-rate (VBR) connections. Business needs for simplified maintenance, management, and access to information on diverse networks are forcing the convergence of these networks along with a new class of real-time multimedia networks. Asynchronous transfer mode (ATM) provides a single infrastructure that cost-effectively and flexibly handles both switching and transmission for the traffic types mentioned above (voice, video, and data) for both local-area networks and wide-area networks. The evolving network convergence requires the adaptation of the legacy PBX voice traffic to ATM. Voice telephony over ATM (VTOA) specifications allow adaptation of compressed or uncompressed voice pulse-code modulated (PCM) data streams into streams (virtual circuits) of CBR cells.

An ATM cell, regardless of the traffic it carries, is a packet 53 octets long: 48 octets of payload attached to a 5 octet header. The header contains addressing and management information used to direct the cell from source to destination and to ensure that the negotiated aspects of traffic-flow through the ATM network are met. Each ATM cell is received from a standard OC3c 155.52 MHz fiber optic interface, it takes a 2.83 microseconds to receive a cell. In a PBX that is utilizing standard PCM streams being received from the fiber optic interface, each cell will contain 5.875 milliseconds of voice information assuming a 125 microsecond sampling rate (standard 8000 Hz sampling rate). For CBR traffic, each cell payload consists of a first octet being used as a header to define CBR traffic aspects of the transmission and the remaining 47 octets to carry CBR information such as additional control and data information. Each ATM cell is received by an ATM layer that processes the cell before transferring it on to an ATM adaptation layer 1. The adaptation layer 1 layer processes the ATM cells such that the CBR traffic contained in those cells is presented in a synchronized manner to the PBX. This means that for each call for which cells are being received from the fiber optic interface, a PCM sample as contained in one octet is presented to the PBX every 125 microseconds.

Given the high transfer rate of each ATM cell, there does not initially appear to be a problem in providing the synchronous PCM data to the PBX. However, the fiber optic interface is receiving information from one or more ATM networks and the transmitting end of the information has to assemble the cells based on the 125-microsecond data rate. The end result is that there can be a large variation in cell delay (jitter) as cells are received at the fiber optic interface. This jitter varies due to congestion within an ATM network and delays in the assembly of cells at the transmitting end of the optical fiber. The end result is that there may not be a PCM sample to transmit to the PBX for a particular call. In addition, when wideband transmission is being carried via the ATM cells, a portion of a frame of the wideband data may also not be available to be transmitted to the PBX introducing problems of synchronization of the data of the frame with new frame data after it is received.

The prior art has attempted to resolve the problem of jitter by delaying the transfer of PC samples from the received ATM cells for a predefined period of time (commonly referred to as build out) at the start of each call. A problem with the prior art solution is that the predefined build out period must be as large as any anticipated delay of the receipt of ATM cells by the optical interface. Resulting in unreasonable delays for each call at the very start of the call. In addition, when a delay is encountered in the receipt of ATM cell information that exceeds the predefined build out period, the prior art method simply puts out a predefined value to the PBX until an ATM cell having the necessary call information is received. When the ATM cell is received, the prior art method then determines where within the received information the present instant of time would exist and transfers this information to the PBX. If the delay is long enough for a number of PCM samples to have been replaced with the predefined value, then some of newly received information is discarded since the prior art method will attempt to start in the correct point in real time losing previous samples for earlier times. However, a more serious problem of the prior art is that no change is made in the predefined build out period to take into account the longer delay in the receipt of ATM cells. This is particularly bothersome, since the congestion problems that cause the initial ATM cell to be delayed will most likely occur again since the occurrence was caused by heavy traffic either within an ATM network or a transmitting end of the call. In addition, the predefined build out is defined on a system or individual optical interface basis and will introduce unneeded delay in may calls that are being received by the optical interface which are not subject to the congestion that may be effecting only one of the calls being transmitted via the optical interface.

SUMMARY OF THE INVENTION

This invention is directed to solving these and other problems and disadvantages of the prior art. According to the invention, only a nominal predefined build out is defined for each optical interface. If an ATM cell is not received within the proper amount of time for a CBR call from the optical interface, the build out is automatically adjusted so that the build out is equal to the amount of delay that was experienced in receiving the next ATM cell for the call. Advantageously, only the build out for the individual call that actually experienced the delay of the ATM cell is redefined. The other calls being handled by the optical interface are not effected by this automatic adjustment of the build out interval for the individual call. In addition, when an ATM cell is delayed for a particular call, the information that is transmitted to the PBX is the last PCM sample of the present ATM cell for that call. This requires in the case of a wideband call which consists of a frame subdivided into a plurality of channels that the frame must be repeated upon an ATM cell being delayed. Advantageously, when the delayed ATM cell is received, all PCM samples for the call are transmitted to the PBX so that no PCM samples are discarded as is done in the prior art.

These and other features and advantages of the present invention will become more apparent from the following description of an illustrative embodiment of the invention considered together with the drawing.

DETAILED DESCRIPTION

Figure 1:
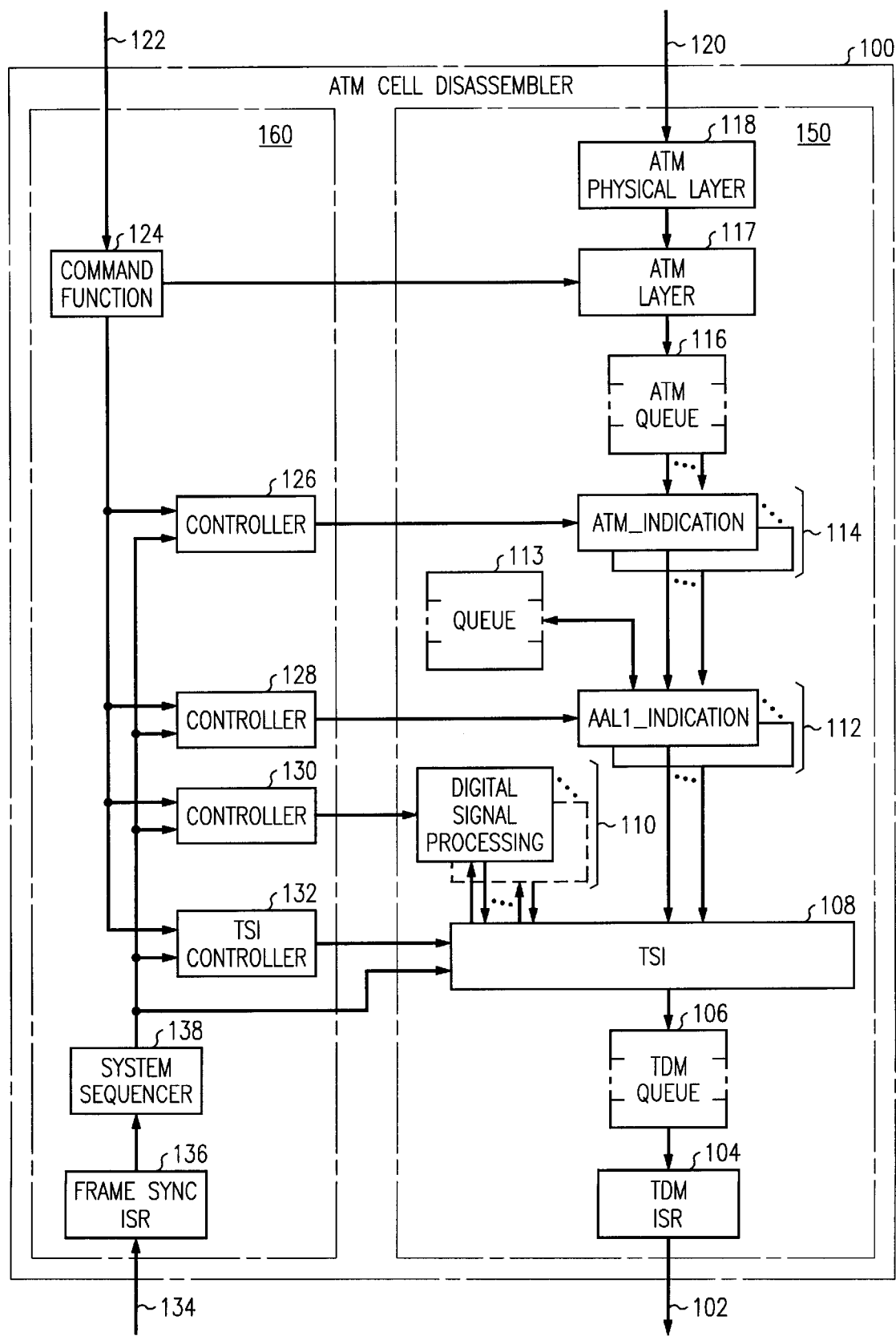
FIG. 1 is a block diagram of an ATM cell disassembler that includes an illustrated embodiment of the invention.

FIG. 1 shows an ATM cell disassembler 100, such as may be used to interface a PBX to an optical fiber or to interface any other ATM interface apparatus to disassemble ATM cells to CBR traffic, such as voice and/or video traffic. Cell disassembler 100 and each of its components may be individually implemented either in hardware or in software/firmware. In the later case, the software or firmware may be stored in any desired memory device readable by a computer such as a read only memory (ROM) device readable by a processor. Illustratively, in the present embodiment, elements 117 and 118 are implemented in a IBM Power PC microcomputer, ATM queue 116 is implemented in a multiport memory, and elements 104–114 and 124–136 are implemented in digital signal processors (DSP). Each DSP is capable of implementing 34 instances of elements 110–114.

ATM cells containing single or multiple streams (also referred to herein as calls, or communications) of CBR traffic are received by cell disassembler 100 via communication medium 120 and follow data path 150 through ATM cell disassembler 100 where successive ATM cells are disassembled into successive segments of traffic streams. If the switching system employing cell disassembler 100 is the Definity® PBX of Lucent Technologies, Inc., the traffic streams are transmitted out on medium 102 which is a time-division multiplex (TDM) bus that carries up to 242 individual streams of traffic in 242 individual time slots of repeating frames. Each frame on medium 102 carries 1 (narrowband) or more (wideband) time slots of each call's traffic stream. Each time slot carries one byte (octet) of traffic.

Overall control of ATM cell disassembler 100 is provided by command function 124. Command function 124 receives control information over control medium 122. If the switching system employing cell disassembler is the above mentioned Definity PBX, control medium 122 is illustratively either a control channel defined by the first five time slots of frames of the TDM bus of the Definity PBX or a packet bus of the Definity PBX. The control information is received by command function 124. This is a command function which tells controllers 126–132 of individual components of data path 150 what their components should be doing and when. In addition, the command function 124 supplies information to ATM layer 117 defining the relationship of ATM cells in ATM queue 116 with respect to the DSPs. For example, command function 124 tells TSI controller 132 when TSI 108 should begin to support a new time slot and which instance of AAL1-indication 112 that time slot should be associated, tells controller 126 what VCI/VPI in instance of ATM-indication 114 should be used for a particular channel, tells controller 128 when to initialize an instance of AAL1-indication 112 for a new channel, and tells controller 130 which instance of digital signal processing 110 is to process which channel and what processing is to be performed. Controllers 126–132 then exert the necessary control over their associated components in data path 150.

When an ATM cell is received via medium 120, ATM physical layer 118 performs the necessary ATM protocol processing on this cell before invoking ATM layer 117. ATM layer 117 performs high level processing of the ATM cell. In particular with respect to the invention, ATM layer 117 accesses the virtual channel field from the ATM header. The ATM layer 117 uses the virtual channel field together with information supplied by command function 124 to determine a reference number which will be utilized by an instance of ATM_indication 114. In addition, ATM layer 117 inserts the ATM cell with the reference number into a queue identified with a particular DSP in ATM queue 116. Subsequently, an instance of ATM_indication 114 accesses this ATM cell from the queue designated for the DSP in which the instance Of ATM indication 114 is running. Utilizing the reference number, the instance of ATM_indication 114 inserts the ATM cell after removing the ATM header and reference number into a queue such as queue 113 of the instance of AAL1_indication 112 that is handling the channel for which the ATM cell is intended. Queues, such as queue 113, maintain a linked list of ATM cells for subsequent use by the instance of AAL1_indication 112 that is processing the particular channel. AAL1_indication 112 is responsible for disassembling the octets in an ATM cell and transferring these octets to TSI 108 in proper sequence via digital signal processing 110. There is one instance of AAL1_indication 112 for each channel regardless of whether the channel is narrowband or wideband.

As a instance of digital signal processing 110 receives an octet representing a PCM sample from an instance of AAL1_indication 112, it performs the appropriate digital processing before transferring the octet to TSI 108. TSI 108 performs the time slot interchange functions which are well known in the art so that the resulting samples on a channel basis are properly presented to medium 102 via TDM queue 106 and TDM ISR 104.

If there is no delay of ATM cells being received by ATM physical layer 118, TSI 108 is supplied with a new PCM sample for each call as is needed by TSI 108 to place the PCM samples on medium 102 via elements 106 and 104. However, if for a call the instance of AAL1_indication 112 does not have an ATM cell within the appropriate queue such as queue 113, then the instance can not supply a new PCM sample to TSI 108. What the instance does is to repeat the previous PCM sample to TCI 108 for a narrowband call and for a wideband call to repeat the entire wideband frame. When the next ATM cell is received by the instance in the appropriate queue, the instance automatically increases the build out interval to take into account the total delay of receiving this next ATM cell and commence transferring to TSI 108 the PCM sample that was not previously available to TSI 108.

Figure 2:
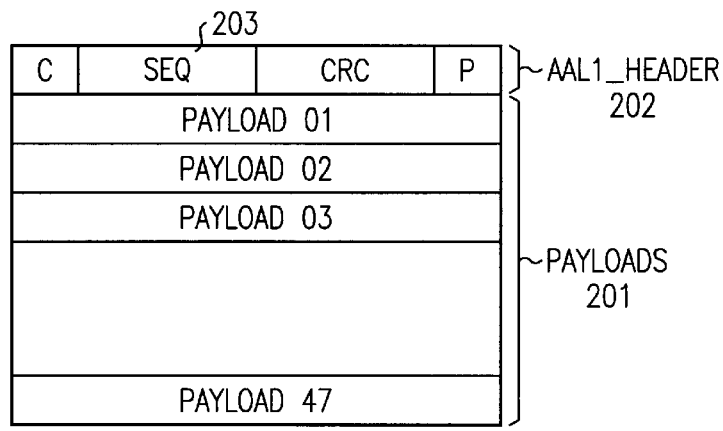
FIGS. 2 and 3 illustrate a cell for use by an AAL1_indication.
Figure 3:
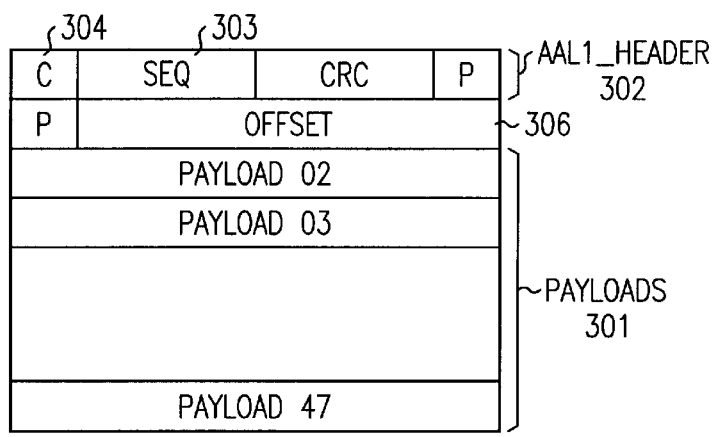

An instance of ATM_indication 114 places into the queue of an instance of AAL1_indication 112 an ATM cell having the structure illustrated in FIG. 2 for a narrowband call and 7 of 8 cells of a wideband call; and an ATM cell having the structure illustrated in FIG. 3 for every eighth cell in a wideband call. The headers illustrated in FIGS. 2 and 3 are commonly referred to as the AAL1_header. In the narrowband case of an ATM cell, payload 201 consists of 47 octets. Within AAL1_headers 202 and 302, only the fields 203 and 303 which are the sequence count fields are of any significance. The remaining fields are utilized for error checking. The sequence count field is utilized to detect loss or miss-inserted cells. The sequence count field is sequentially incremented for each new ATM cell. The ATM cell illustrated in FIG. 3 for a wideband channel differs in that the number of octets that will contain PCM samples varies from 46 to 47 depending on the following conditions. If bit 304 is a 1 and the sequence count field 303 is even, then octet 306 (offset) is present in payloads 301. Offset 306 defines where in payloads 301 the new frame is starting for the wideband channel. For example, in a T1 wideband transmission, the frame starts every 24 channels. Bit 304 is commonly called the convergence sublayer indication whose use will be described in greater detail later.

Figure 4:
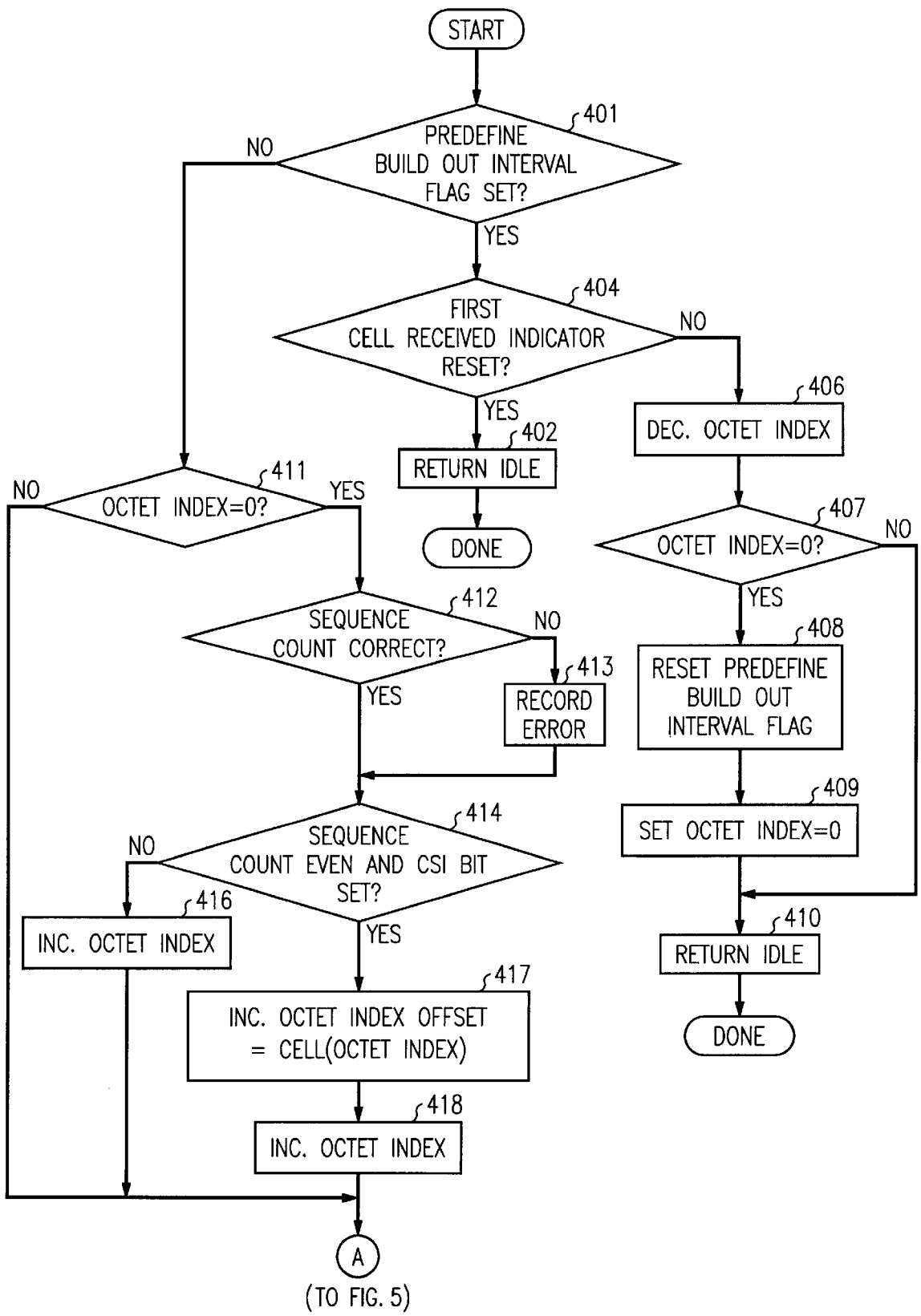
FIGS. 4 and 5 indicate operations of an instance of an AAL1_indication.
Figure 5:
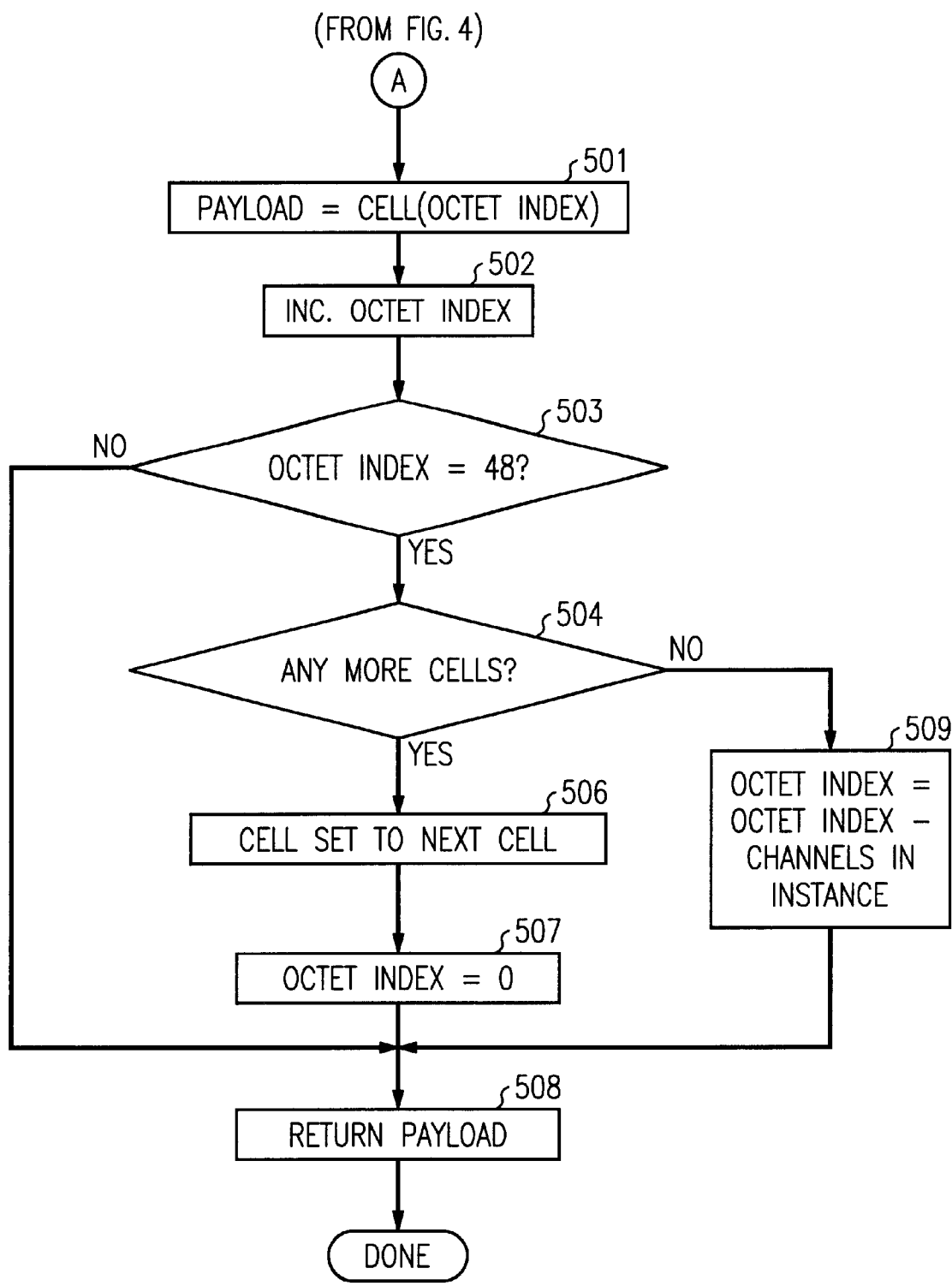

FIGS. 4 and 5 illustrate in greater detail the operations performed by an instance of AAL1_indication 112 in processing an ATM cell as illustrated in either FIG. 2 or FIG. 3. Each time that TSI 108 is invoked by system sequencer 138 and needs a PCM sample for a particular channel it signals via element 110 to the instance of AAL1_indication 112 handling that channel. This invokes the operation illustrated in FIGS. 4 and 5. When a new channel is being set up, controller 128 initializes various variables within the instance of AAL1_indication 112. A first call received indication is reset, a build out interval flag is set, and the octet index is set equal to the predefined build out interval. (The build out interval is equal to the initial contents of the octet index multiplied by 125 microseconds divided by the number of channels per cell.) Each time a request is received by TSI 108, an instance of AAL1_indication 112 executes decision block 401. The latter decision block tests the build out interval flag. If the build out interval flag is set indicating that the build out interval has not yet been achieved at the start of a call, control is transferred to decision block 404. If the flag is reset, control is transferred to block 411. If it is at the very beginning of a call, the first cell may not yet have been received from communication medium 120, and decision block 404 transfers control to block 402 which transmits an idle code to TSI 108. The decision of whether the first cell has been received is based on the state of the first cell received indicator.

As long as the first cell received indicator is reset, decision block 404 transfers control to block 402. Once the first cell has been received,. control is transferred to block 406 which decrements the octet index which at this point in time is being utilized to calculate the build out interval. Control is then transferred decision block 407 which tests the octet index for being equal to zero. If the octet index is equal to zero, control is transferred to block 408 which resets the build out interval flag since the build out interval has now been accomplished. Before transferring control to block 409 which sets the octet index to zero in preparation for processing the first ATM cell. Control is then transferred to block 410 which returns the idle code to TSI 108. Returning to decision block 407, if the answer is no control is immediately passed to block 410 so that the idle code can be returned. After execution of block 410, the instance is done processing the request from TSI 108.

After the first cell has been received and the predefined build out interval has been accomplished, control will always be transferred to decision block 411 by decision block 401 when the instance of AAL1_indication 112 is activated by TSI 108. Decision block 411 examines the octet index. The octet index defines within the payload of the ATM cell being processed which octet is going to be utilized. If the octet index equals zero, this means that the AAL1_header (202 or 302) is being processed. At this point in time, it is not clear whether the payrolls 201 or 301 illustrated in FIG. 2 or FIG. 3 are being utilized. First, decision block 412 checks the sequence count field to determine if the ATM cell received is in the correct sequence. If the ATM cell is not in the correct sequence, control is transferred to block 413 which increments a variable which keeps track of lost cells before transferring control to decision block 414. If the answer in decision block 412 is that the ATM cell is in the correct sequence, control is immediately transferred to decision block 414. Decision block 414 determines whether the cell format is that indicated in FIG. 2 or FIG. 3. This is determined by determining if the sequence count is even and the convergent sublayer indication (bit 304) in FIG. 3 is set. If the answer is no, then the octet being processed is not octet (202 or 302) which contains the AAL1_header and control is transferred to block 416 which increments the octet index by one before transferring control to block 501 of FIG. 5. A no answer in decision block 414 means that some other portion of the payload are being processed. If the answer in decision block 414 is yes, block 417 first increments the octet index and then, utilizes the incremented octet index to obtain offset octet 306 of FIG. 3. The offset is utilized to determine the frame boundary within the ATM cell. After execution of block 417, block 418 increments the octet index before transferring control to block 501 of FIG. 5. Returning to decision block 411, if the octet index is not equal to zero, then an octet within the payloads is simply being processed and control is immediately transferred to block 501 of FIG. 5.

Block 501 of FIG. 5 sets the variable payload equal to the octet determined by the octet index. For example, if the octet index is 2, then payload will be set equal to octet 2 also referred to as payload 2 in FIG. 3 or FIG. 2. The variable payload now contains the octet which will be transferred to TSI 108. Block 502 increments the octet index and transfers control decision block 503. Decision block 503 determines if all of the octets in the present ATM cell have been processed. If the octet index equals 48 than all of the octets have been processed. If the index does not equal 48, then there remain octets within the ATM cell to be processed, and control is simply transferred to block 508 which communicates the octet in payload to TSI 108 via digital signal processing 110.

If all of the octets have been processed in the present cell, decision block 503 transfers control to decision block 504 which determines if there are any more cells present in the queue controlled by the present instance of AAL1_indication 112. If the answer is yes in decision block 504, the next cell is set to be the cell being processed in block 506, and block 507 sets the octet index equal to zero so that a determination can be made in blocks 412–418 of FIG. 4 concerning the state of the header. After execution of block 507 control is transferred to block 508. If the answer in decision block 504 is no, control is transferred to block 509. Since there is not a next ATM cell, it is necessary to repeat the information from the present ATM cell. For purposes of a narrowband call, the present octet loaded into variable payload is payload 47, and the octet index has been incremented to a 48. In order for the octet contained in payload 47 of FIG. 2 to be retransmitted the next time the instance of AAL1_indication 112 is called, octet index is subtracted by the number of channels, which in this case is 1, resulting in the index being set back to payload 47. What has occurred in terms of the build out is that 125 microseconds has been added to the predefined build out. The next time this instance called, block 501 inserts into the payload variable payload 47 of FIG. 2. Once again, decision block 503 answers yes to the fact that the octet index is equal to 48. If another ATM cell has not been added to the queue of the instance, then control is once again transferred to block 509 which repeats payload 47 consequently adding another 125 microseconds to the build out. If on the other hand a new cell has arrived, decision block 504 transfers control to block 506 which sets the cell being processed to the next cell. However, payload 47 is still transmitted by block 508. However, when the instance is next called, decision block 411 transfers control to decision block 412 with the end result being that payload 1 is transmitted to TSI 108. Note, that payload 1 is the correct octet for the channel.

For a wideband call, the processing is similar, however, block 509 sets the octet index equal to the octet index minus the number of channels in the instance. This sets the octet index back one full frame. A full frame is processed from the contents of the present cell before the contents of a newly arrived cell are utilized. Note, that even for a wideband call, each time the instance is called it only adds 125 microseconds to the build out delay.

Figure 7:
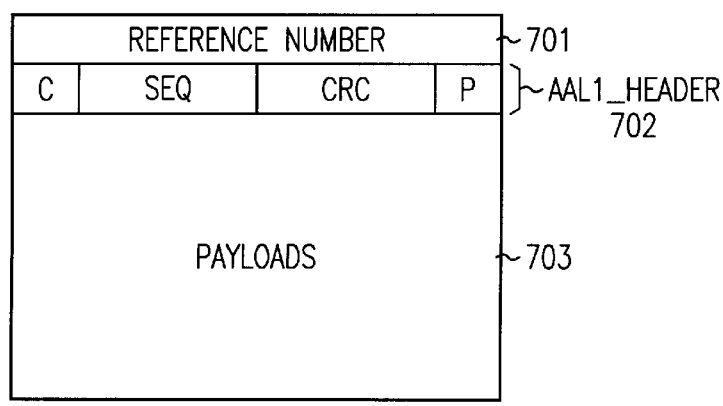
FIG. 7 illustrates a cell for processing by an instance of an ATM_indication.
Figure 6:
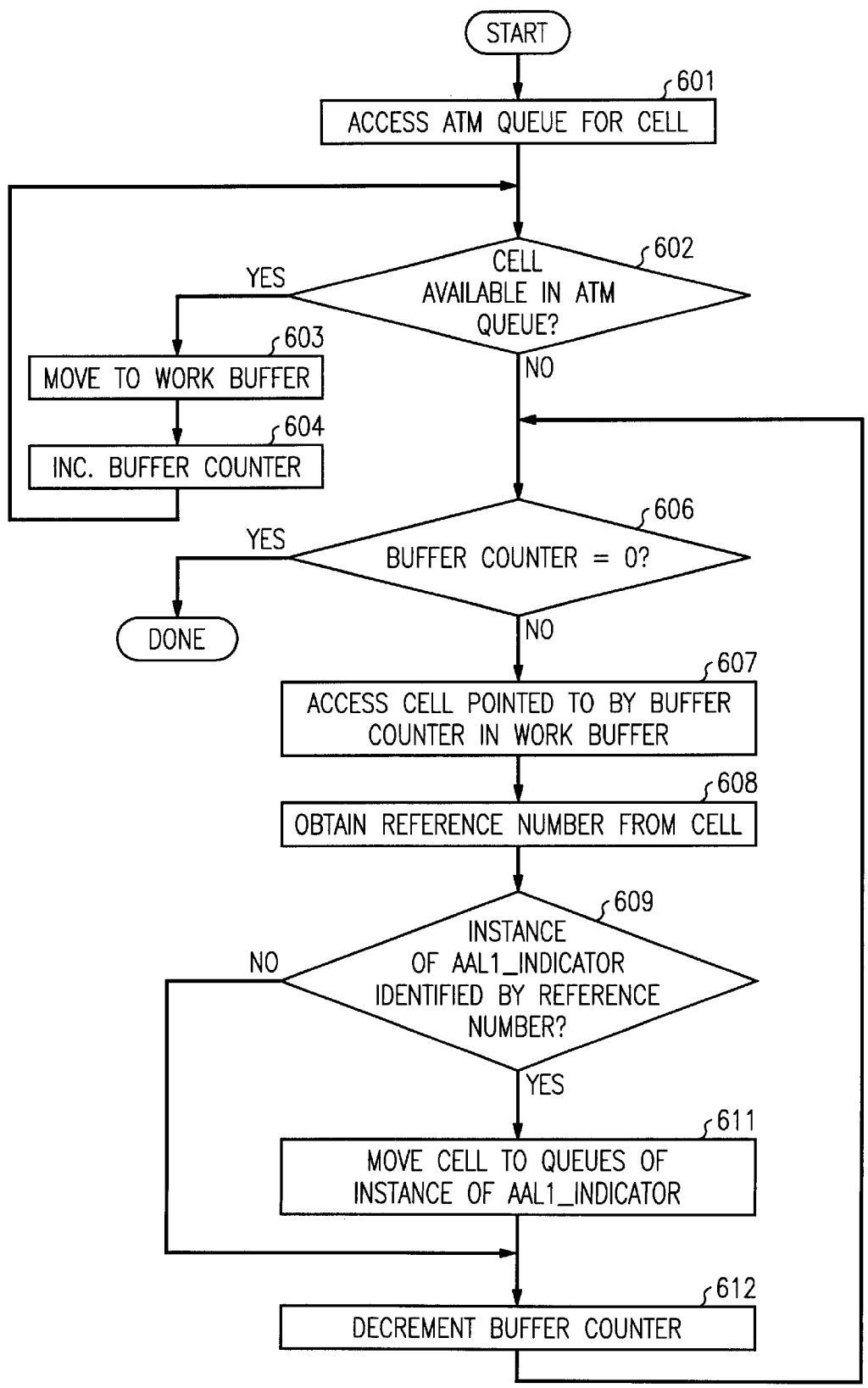
FIG. 6 illustrates operation of an instance of an ATM_indication.

FIG. 6 illustrates the operations performed by each instance of ATM_indication 114 when started by controller 126. As previously described, ATM layer 117 inserts ATM cells into ATM queue 116 on the basis of individual DSPs. This decision is made based on internal tables received from command function 124 and the virtual channel field. The information stored for each cell is illustrated in FIG. 7. Octet 701 contains the reference number which is utilitized by an instance of ATM_indication 114 to determine which instance of AAL1_indication 112 is to receive the cell. There are an equal number of instances of ATM_indication 114 as instances of AAL1_indication 112; however, each instance of ATM_indication 114 will transfer cells from ATM queue 116 to any instance of AAL1_indication 112 executing on the same DSP. An instance of ATM_indication 114 will attempt to transfer two cells from ATM queue 116 to instances of AAL1_indication 112. However, there may be no cells or only one cell available in ATM queue 116 for the particular DSP. As previously described, each instance of AAL1_indication 112 maintains its own distinct queue of cells to be processed by that instance. Each instance is identified by a reference number which must correspond to reference number 701 of FIG. 1 before the cell is stored in the queue of the instance of AAL1_indication 112.

When started, block 601 accesses ATM queue 116 to see if there is a cell to be transferred for the particular DSP. Each instance of ATM_indication 114 maintains a buffer that can contain a maximum of two cells. The cells are initially moved into this buffer before being transferred to the queue of the instance of AAL1_indicator 112.

When the instance of FIG. 6 is started, block 601 first accesses ATM queue 116 for a cell. Decision block 602 then determines if a cell was available and the buffer counter is less than two. If the answer is yes, control is transferred to block 603 which moves the cell to the work buffer, and block 604 increments the buffer counter. When there is no longer a cell present in the ATM queue or the buffer counter is equal to or greater than two, control is transferred to decision block 606. Decision block 606 examines the buffer counter, and if it is equal to zero, then the instance is done processing. If the buffer counter is not equal to zero, block 607 accesses the cell pointed to in the work buffer by the buffer counter. Block 608 obtains the reference number from the cell (reference number 701 of FIG. 7), and decision block 609 scans through the instances of AAL1_indicator 112 to find an instance who has the same reference number as obtained in block 608. If a match is found, block 611 moves the cell into the queues of the instance of AAL1_indicator that matched the reference number obtained from the cell in the work buffer. After execution of block 611, control is transferred to block 612 which decrements the buffer counter before transferring control back to decision block 606. If the answer in decision block 609 is no, then the cell is simply discarded, and control is transferred to block 612 and then back to decision block 606. The cell is discarded since there is no instance of AAL1_indicator 112 that can utilize this cell.

Figure 8:
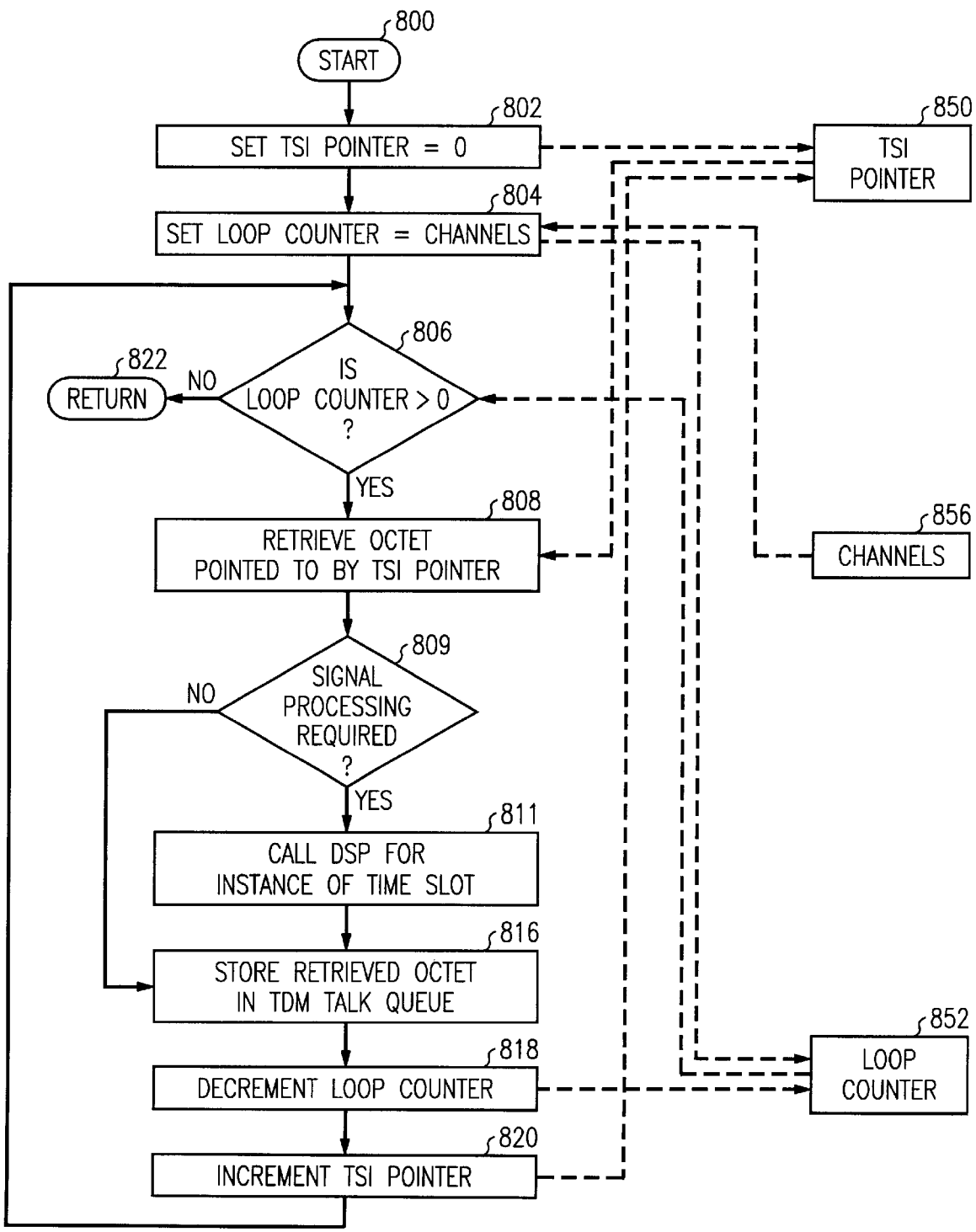
FIG. 8 illustrates operations of an instance of a TSI.

The high-level functionality of TSI 108 is shown in FIG. 8. Upon its invocation, at step 800, TSI 108 initializes a TSI pointer 850. TSI pointer 850 points into a TSI control memory to a location that specifies the received time slot which the TSI should presently be outputting. TSl 108 also initializes a loop counter 852 to the number of channels of traffic, at step 804. Loop counter 852 is thus initialized to the number of channels of traffic carried by received frames. TSI 108 then checks is the value of loop counter 852 is greater than zero, at step 806. If not, TSI 108 has completed the time-slot interchanging of a frame, and so it returns to the point of its invocation, at step 822. But if the value of loop counter 852 is greater than zero, TSI 108 continues its function by retrieving, from an internal control structure, the time slot (octet of traffic) pointed to by TSI pointer 850 and the AAL_1 instance associated with the time slot at step 808. Then, decision step 809 determines if the retrieved octet requires signal processing. If the answer is yes, control is transferred to step 811 which calls the associated instance of digital signal processing 110 to perform the required signal processing. After the signal processing is performed, control is transferred to step 816. If the answer is no in decision step 809, control is transferred to step 816. At step 816, TSI 108 outputs the retrieved time slot to TDM queue 106. TSI 108 then decrements the value of loop counter 852, at step 818, increments the value of TSI pointer 850, at step 820, and returns to step 806 to determine if it is done processing a full frame of traffic.

Of course, various changes and modifications to the illustrative embodiment described above may be envisioned by those skilled in the art. Such changes and modifications can be made without departing from the spirit and the scope of the invention and without diminishing its attendant advantages. It is therefore intended that such changes and modifications be covered by the following claims.

What is claimed is:

1. A method for providing automatic build out intervals for streams of information received by a receiver over an asynchronous communications link with a synchronous communications medium interconnected to the receiver, comprising the steps of:

asynchronously receiving at the receiver the streams of information;

synchronously communicating the received streams of information to the synchronous communication medium;

detecting absence of data for one of the received streams of information from asynchronous communication link;

determining a time period until new receipt of data for the one of the received streams of information from the asynchronous communication link; and setting the automatic build out interval for the one of the received streams of information equal to the determined time period.

2. The method of claim 1 wherein the automatic build out intervals for the other ones of the received streams of information are unaffected by the step of setting the automatic build out interval for the one of the received streams of information.

3. The method of claim 2 wherein each of the streams of information comprises blocks of information with each of the blocks of information comprising a plurality of data elements and the step of detecting comprises the step of identifying a first one of the data elements of the-one of the received streams of information that is absence; and the step of determining the time period comprises the step of identifying a next received first one of the data elements of the one of the received streams of information and the step of adjusting the time period to be equal to a time between identification of the absence of the first one of the data elements of the one of the received streams of information and the identification of the next received first one of the data elements of the one of the received streams of information.

4. The method of claim 3 wherein the step of synchronously communicating comprises the step of restarting communication of the one of the received streams of information to the synchronous communication medium with the next received first one of the data elements of the one of the received streams of information.

5. The method of claim 4 wherein the step of synchronously communicating further comprises the step of repeating a previous received first one of the data elements of the one of the received streams of information to the synchronous communication medium upon the detection of the absence of the first one of data elements of the one of the received streams of information.

6. The method of claim 3 wherein each of the blocks of information comprises a plurality of channels with each of the channels comprising a subset of the data elements and one of the plurality of channels comprising the first one of data elements and the step of synchronously communicating further comprises the step of repeating a previous received one of the plurality of channels and subsequent other ones of the plurality of channels of the one of the received streams of information to synchronous communication medium upon the detection of the absence of the first one of data elements of the one of the received streams of information.

7. The method of claim 6 wherein the step of synchronously communicating comprises the step of restarting communication of the one of the received streams of information to the synchronous communication medium with a next one of the plurality of channels of the one of the received streams of information.

8. The method of claim 7 wherein the synchronous communication medium is a time-division-multiplexed medium.

9. The method of claim 8 wherein in each of blocks of information is an asynchronous transfer mode cell and each one of data elements is an octet of an asynchronous transfer mode cell.

10. An apparatus for providing automatic build out intervals for streams of information received by a receiver over an asynchronous communications link with a synchronous communications medium interconnected to the receiver, comprising:

means for asynchronously receiving at the receiver the streams of information;

means for synchronously communicating the received streams of information to the synchronous communication medium;

means for detecting absence of data for one of the received streams of information from asynchronous communication link;

means for determining a time period until new receipt of data for the one of the received streams of information from the asynchronous communication link; and means for setting the automatic build out interval for the one of the received streams of information equal to the determined time period.

11. The apparatus of claim 10 wherein the automatic build out intervals for the other ones of the received streams of information are unaffected by setting the automatic build out interval for the one of the received streams of information.

12. The apparatus of claim 11 wherein each of the streams of information comprises blocks of information with each of the blocks of information comprising a plurality of data elements and the means for detecting comprises means for identifying a first one of the data elements of the one of the received streams of information that is absence; and the means for determining the time period comprises means for identifying a next received first one of the data elements of the one of the received streams of information and means for adjusting the time period to be equal to a time between identification of the absence of the first one of the data elements of the one of the received streams of information and the identification of the next received first one of the data elements of the one of the received streams of information.

13. The apparatus of claim 12 wherein the means for synchronously communicating comprises means for restarting communication of the one of the received streams of information to the synchronous communication medium with the next received first one of the data elements of the one of the received streams of information.

14. The apparatus of claim 13 wherein the means for synchronously communicating further comprises means for repeating a previous received first one of the data elements of the one of the received streams of information to the synchronous communication medium upon the detection of the absence of the first one of data elements of the one of the received streams of information.

15. The apparatus of claim 12 wherein each of the blocks of information comprises a plurality of channels with each of the channels comprising a subset of the data elements and one of the plurality of channels comprising the first one of data elements and the means for synchronously communicating further comprises means for repeating a previous received one of the plurality of channels and subsequent other ones of the plurality of channels of the one of the received streams of information to synchronous communication medium upon the detection of the absence of the first one of data elements of the one of the received streams of information.

16. The apparatus of claim 15 wherein the means for synchronously communicating comprises means for restarting communication of the one of the received streams of information to the synchronous communication medium with a next one of the plurality of channels of the one of the received streams of information.

17. The apparatus of claim 16 wherein the synchronous communication medium is a time-division-multiplexed medium.

18. The apparatus of claim 17 wherein in each of blocks of information is an asynchronous transfer mode cell and each one of data elements is an octet of an asynchronous transfer mode cell.

19. A communications apparatus for performing the method of claim 1 or 2 or 3 or 4 or 5 or 6 or 7 or 8 or 9.

* * * * *